April 12, 1927.
J. S. FLUOR
ATMOSPHERIC COOLING TOWER
Filed March 22, 1923
1,624,324
2 Sheets-Sheet 1
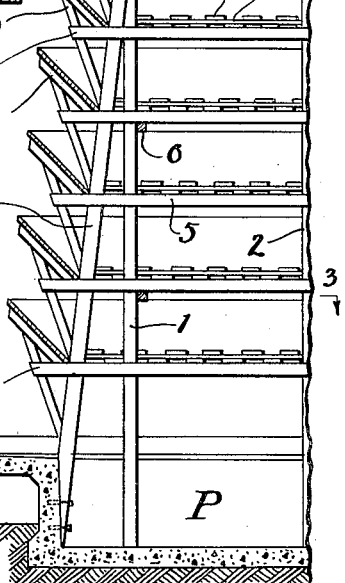
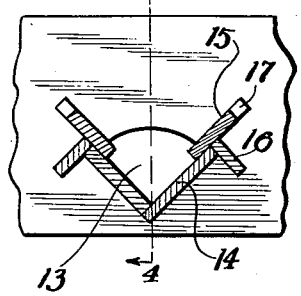
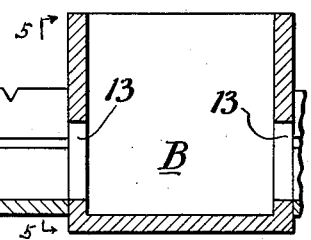
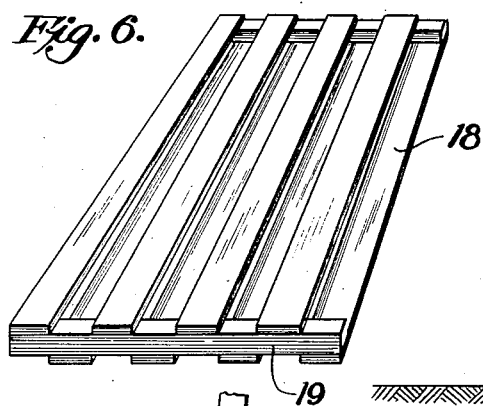
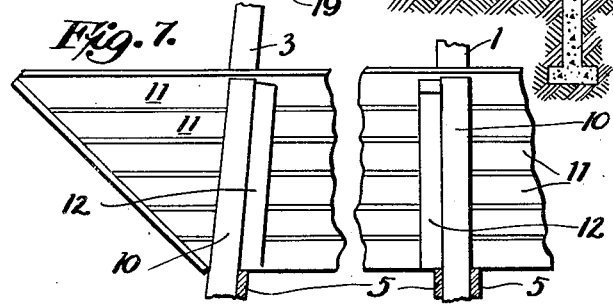
Inventor
John Simon Fluor
by Hagard and Miller
Attys April 12, 1927.

J. S. FLUOR 1,624,324

ATMOSPHERIC COOLING TOWER

Filed March 22, 1923      2 Sheets-Sheet 2

Inventor
John Simon Fluor
by Hazard and Miller
Attys

Patented Apr. 12, 1927.

1,624,324

UNITED STATES PATENT OFFICE.

JOHN SIMON FLUOR, OF SANTA ANA, CALIFORNIA.

ATMOSPHERIC COOLING TOWER.

Application filed March 22, 1923. Serial No. 626,846.

My present invention is an atmospheric cooling tower, and it is an object of this invention to provide a simplified and highly efficient means for taking the heat out of water which may have been used as a cooling medium in contact with coils or cylinders, such as the cylinders of engines, pumps or the like, and which water is to be further used in a cyclical or other manner.

It is a further object of this invention to provide a cooling tower of novel design, the frame of which may be in the form of a frustrum of a pyramid, expanding in the direction in which the descending streams of water, or other liquid, are progressively subdivided; and in the frame of my tower the interfitting parts are so secured together as to be readily separated, so that the entire organization might fittingly be characterized as a knock-down cooling tower. In my preferred construction I employ distributing decks and louvre sections of improved design and respectively adapted to be handled as units and optionally to be retained in place by gravity.

It is further object of this invention to provide a cooling tower through which air shall be free to move not only laterally, but upward or downward or otherwise; the slats or elements of which my decks are preferably formed being so spaced apart that air shall be free to move upward or downward through the same openings by which the water is permitted to descend, and the slats being staggered in such manner that the foregoing results may be obtained without permitting an excessive free drop of water at any point.

Effective cooling being dependent upon successful exposure to the air and consequent evaporation, especially such evaporation as occurs during the friction of small descending droplets passing through the air, it is accordingly an object of the present invention to provide means for distributing and controlling the descent of and conserving water which may be pumped into a trough at the top of a tower.

It is a further object of this invention to provide novel louvre sections, novel boards or stock for use in the construction thereof, and novel means for supporting the mentioned sections; and my preferred supporting means are entirely suitable for use in towers which flare toward the bottom and entirely consistent also with the stability of the tower and with my mentioned object of so subdividing the descending streams of water as to effect a maximum evaporative exposure thereof to the air.

Other objects of my invention will appear from the following description of a preferred embodiment thereof and the appended claims, when taken in connection with the accompanying drawings, in which Figure 1 is a vertical semi-section of a tower of my improved design.

Fig. 4 is an enlarged, vertical, sectional view showing the box into which water may be delivered to the tower, and part of a distributing trough extending from said box, this view being taken on the line 4—4 of Figure 5.

Fig. 5 is a vertical section which may be regarded as taken on line 5—5 of Figure 4.

Fig. 6 is a perspective view of an isolated distributing deck of my design.

Fig. 7 is a detail elevational view taken at the outside of one corner of the tower and intended to facilitate understanding of the method by which I prefer to support my louvres.

Fig. 8 is an enlarged detail showing in cross section the type of board or stock which I prefer to employ in the construction of my louvres.

Figure 2:
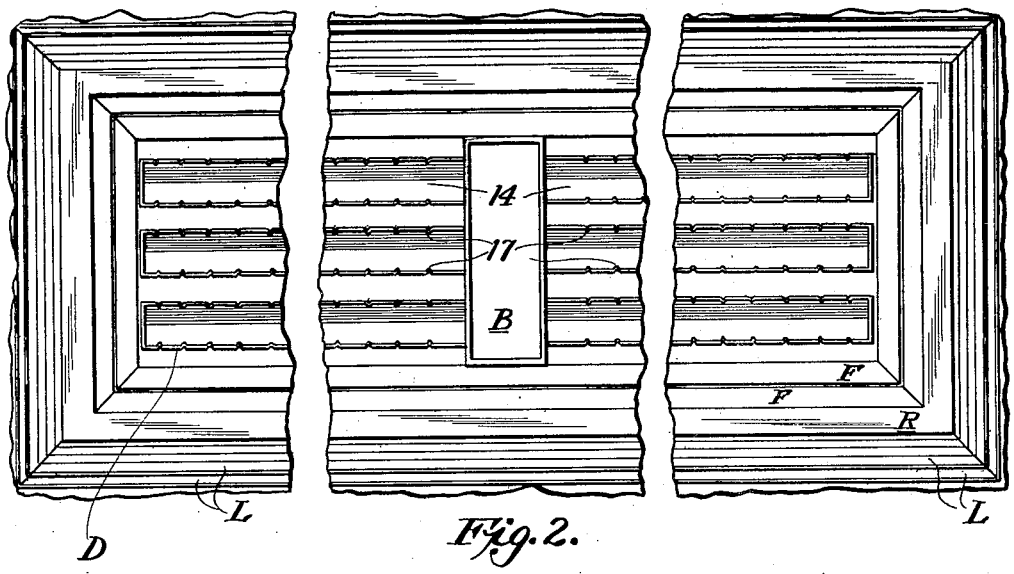
Fig. 2 is a top plan view of the same, with parts broken away.
Figure 3:
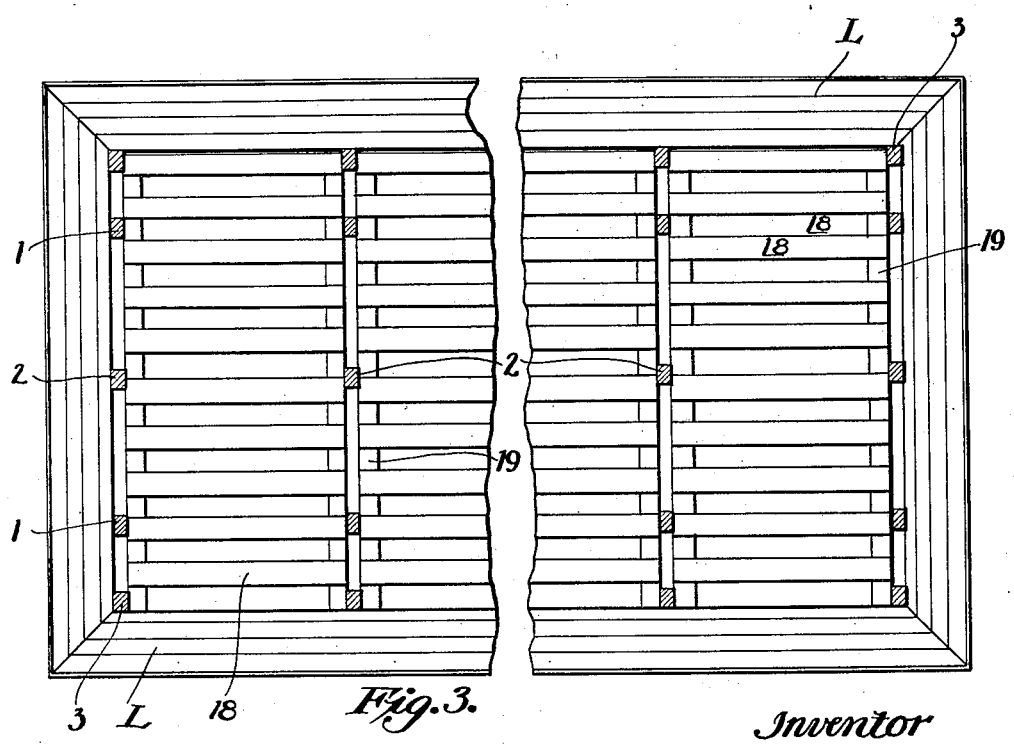
Fig. 3 is a horizontal section substantially on the line 3—3 of Figure 1.

Referring in detail to the parts of that specific embodiment of my invention which I have chosen for illustration, it will be understood that this invention comprises broadly, a tower T provided at the top with a receiving box B, from which distributing troughs D may extend laterally to deliver water or other liquid overflowing therefrom and permit it to descend into contact with successive tiers of distributing decks W; loss of water through lateral openings being prevented by the provision of suitable louvres L, and the water being finally permitted to collect in a reservoir or pool P, at the bottom of the tower.

It being understood that cooling towers have heretofore commonly been so constructed as to have substantially a uniform diameter throughout their vertical extent, it is an important feature of the present invention to so construct the tower that its diameter shall increase toward the lower portion thereof, and for this purpose my tower may comprise, in addition to usual vertical elements such as are shown at 1 and 2, inclined elements such as are shown at 3, all of the framing elements referred to being preferably bolted, and secured by horizontal supports 5 and 6, and optionally also by diagonal braces such as are shown at 7 and 8. By the construction referred to, the stability of the tower is improved, allowance is made for the increasing subdivision of the streams of water during their descent, and superior provision is made for the circulation of the air in contact therewith.

The respective ends of the horizontal supports 5 may be permitted to form lateral extensions 9, and to provide means for securing the diagonal braces 10, whose lower ends may contact with inclined elements 3, and whose upper ends may thus provide suitable supports for the removable louvre sections L. These sections are preferably formed of parallel boards 11, of the special form best shown in Figure 8, and secured together by battens or cleats 12, adapted to fit in between the braces 10 in the manner best shown in Figure 7, the bottoms of the interfitting louvres being adapted to contact with the horizontal supports 5 and to be retained in place by gravity, and the lowest louvres being the largest longitudinally.

Although my removable louvre sections may be formed of any preferred stock, it being understood that the louvres serve as splash-boards to prevent dispersal and loss of water and as shields to exclude dust and check excessive movements of air, I prefer to employ therein an inter-locking stock formed by a symmetrical channelling of the opposite faces of suitable boards, in such manner as to form the dovetailing or self-tightening overlap best shown in Figure 8, this construction being such that a shrinkage in the boards tends to bring increasingly thicker portions of the edges thereof into effective contact. In other words, half-laps are formed upon the meeting sides of the boards, said half-laps being thickest at their outer edges, and there being inclined meeting faces so that as the boards shrink the inclined faces will be drawn toward each other and tighten the joints.

Water or other liquid which is to be exposed to the atmosphere being first pumped (by any suitable means not shown) or otherwise delivered into the boxes B, may be permitted to flow through openings 13 into the mentioned distributing troughs D; and I prefer to form these troughs in the manner best shown in Figures 4 and 5, from an inspection of which it will appear that a V-shaped distributing element 14 having been first provided, notched boards 15 are so secured to the lateral edges of these members as to constitute practically an adjustable extension thereof; and aprons 16 are so secured to the outer edges of the members 14 as to spread and equalize the flow of water delivered through the notches 17, as referred to. By this means the separate streams of water which find exit through the notches 17 are converted into a substantially continuous thin film or sheet of water, which descends therefrom onto the uppermost tier of distributing decks, dripping therefrom to the successive distributing decks throughout the tower, the lowermost tier having the largest extent.

While any desired form of distributing decks might be used in conjunction with other features of my invention, I prefer to employ separable units of the character best shown in Figure 6, these decks being advantageously made of strips or slats 18 of wood or other material, ⅜ by 3-inch stock being entirely suitable, these strips being spaced apart in a staggered relationship by suitably securing the ends thereof to cleats or supports 19, which may be, for example, 1½ by 1½ inches in cross section, each unit formed in the foregoing manner being adapted to be separately placed and secured, as by gravity or by nailing, upon the horizontal supports 5, which constitute a part of the tower frame.

By the construction just described, it will be understood that, although the stream or sheet delivered onto any deck can not pass directly therethrough, the descent of water from a deck need not and does not prevent a concurrent movement of air, either upward or downward or diagonally, with reference to the movement of the descending liquid. Air may ascend by a zig-zag path simultaneously with the descent of water by a similar path, the arrangement of the slats constituting the successive tiers of distributing decks being such that no drop of water can pass completely through any deck without contact therewith, and the slats being spaced apart, both horizontally and vertically, so that descending streams of water can not completely fill the openings therebetween.

From the foregoing description of one preferred form of my novel cooling tower, it will be understood that although my invention comprises novel features in the framing of such a tower, in the distributing troughs employed therein, as well as in the distributing decks and the louvres, and the means by which these elements are supported, all of the novel features referred to cooperate in the production of a knockdown cooling tower which may be easily assembled or dissociated, and which has demonstrated an unusual efficiency, it being possible thereby to cool a given quantity of liquid in a given time to a temperature substantially lower than has heretofore been possible by the use of towers of known construction.

It will be obvious that the use of the flooring F, surrounded by the railing R, at the top of a cooling tower of my improved design, is entirely a matter of discretion, involving nothing of patentable novelty.

It will be noted on reference to Fig. 8, that the dove-tailed overlapping louvre boards are also provided with an inclined surface on each board from the overlapping section, these inclined surfaces meeting the side faces of the boards at an obtuse angle. By this construction, should the boards expand, the overlapping parts can ride to a certain extent on these inclined surfaces and thus prevent buckling of the boards. As the dove-tailed portions with their inclined surfaces where the boards overlap, provide for a tight joint, when the boards shrink the inclined surfaces also accommodate the expansion or swelling of the boards.

Although I have herein described but one embodiment, it will be understood that various features thereof might be independently employed, and also that various modifications might be made therein without departure from the spirit and scope of my invention, as the same is indicated above and in the following claims.

What I claim is:

1. In an atmospheric cooling apparatus, a tower provided with parallel distributing deck areas increasing in extent toward the bottom of the tower, a louver comprising boards having overlapping half laps, said half laps being thickest at their outer edges and having inclined meeting faces, so that as the boards shrink the faces will be drawn toward each other and tighten the joints.

2. In an atmospheric cooling apparatus, a louver constructed of boards having a dove-tail overlap with contacting surfaces, and surfaces extending inwardly from the overlap at an obtuse angle to the contacting surfaces on opposite sides of the boards, the dove-tail overlap constituting a tight joint should the boards shrink, and the obtuse surfaces forming a tight joint should the boards swell.

3. In an atmospheric cooling apparatus, louvers constructed of boards, the boards having portions in overlapping relation, the overlapping portions being thickest adjacent their edges, and having contacting surfaces so that as the boards shrink the joint between the overlapping portions will be caused to tighten, the boards having surfaces extending from the contacting surfaces towards the center of each contiguous board at an obtuse angle to the contacting surfaces and forming a tight joint should the boards swell.

4. In an atmospheric cooling apparatus, a louver comprising boards having overlapping half laps, said half laps being thickest at their outer edges, and having inclined meeting faces so that as the boards shrink the faces will be drawn against each other and tighten the joints, the boards also having surfaces contiguous to the said inclined surfaces at an obtuse angle thereto extending towards the center of contiguous boards and on opposite sides, the said latter surfaces forming a bearing for the overlapping edges of the boards should said boards swell.

5. An atmospheric cooling tower including supporting posts, tie members connecting said supporting posts, braces extending upwardly and outwardly from said supporting posts, and louvers resting against said braces and upon said tie members against said posts.

6. An atmospheric cooling tower including supporting posts, horizontal tie members connecting said supporting posts and extending outwardly therefrom, braces extending upwardly and outwardly from said supporting posts and connected intermediate their ends to the ends of said tie members, and louvers resting against the upper ends of said braces and having their lower ends resting upon said tie members against said posts.

In testimony whereof I have signed my name to this specification.

J. SIMON FLUOR.